(12) United States Patent
Teets et al.

(10) Patent No.: US 7,574,853 B2
(45) Date of Patent: Aug. 18, 2009

(54) MICROTURBINE WITH CHP SYSTEM HAVING A DISTILLATION APPARATUS

(75) Inventors: Joseph Michael Teets, Hobe Sound, FL (US); Jon William Teets, Scottsdale, AZ (US)

(73) Assignee: TMA Power, LLC, Hobe Sound, FL (US)

(*) Notice: Subject to any disclaimer, the term of this patent is extended or adjusted under 35 U.S.C. 154(b) by 185 days.

(21) Appl. No.: 11/517,707

(22) Filed: Sep. 8, 2006

(65) Prior Publication Data

US 2007/0084205 A1    Apr. 19, 2007

Related U.S. Application Data

(60) Provisional application No. 60/727,518, filed on Oct. 17, 2005.

(51) Int. Cl.
F02G 3/00    (2006.01)

(52) U.S. Cl. .................... 60/39.01; 60/801; 60/39.5

(58) Field of Classification Search ............. 60/39.01, 60/39.33, 39.5, 80, 39.51
See application file for complete search history.

(56) References Cited

U.S. PATENT DOCUMENTS

| | | | |
|---|---|---|---|
| 3,187,188 A | 6/1965 | Adkins | |
| 3,724,229 A * | 4/1973 | Seliber | 62/50.3 |
| 4,282,067 A * | 8/1981 | Katz et al. | 202/180 |
| 4,671,856 A | 6/1987 | Sears | |
| 4,769,113 A | 9/1988 | Sears | |
| 4,869,067 A | 9/1989 | Sears | |
| 5,329,758 A | 7/1994 | Urbach | |
| 5,497,615 A | 3/1996 | Noe | |
| 5,685,156 A | 11/1997 | Willis | |
| 5,840,159 A * | 11/1998 | Rosenblad | 203/10 |
| 5,855,112 A * | 1/1999 | Bannai et al. | 60/39.511 |
| 6,314,717 B1 | 11/2001 | Teets | |
| 6,355,456 B1 | 3/2002 | Hallberg | |
| 6,605,928 B2 | 8/2003 | Gupta | |
| 6,745,574 B1 * | 6/2004 | Dettmer | 60/784 |
| 6,891,282 B2 | 5/2005 | Gupta | |
| 6,901,759 B2 * | 6/2005 | Frutschi | 60/772 |
| 7,007,453 B2 | 3/2006 | Malsotsenko | |
| 2002/0053196 A1 * | 5/2002 | Lerner et al. | 60/39.182 |
| 2004/0020206 A1 | 2/2004 | Sullivan | |

* cited by examiner

Primary Examiner—Hoang M Nguyen

(57) ABSTRACT

A power plant with a CHP system having a distillation apparatus to yield a high thermally efficient electrical power plant for reduced fuel usage and subsequent lower $CO_2$ emission specie. The incorporation of a Combined Heat and Power (CHP) system with a microturbine, makes use of the low emissions gas turbine exhaust gas waste heat of this electrical power generation plant for distillation processes, replacing the current use of electrical heating elements of the distiller unit. The inventive device includes a distiller apparatus and a microturbine gas turbine electrical power plant, a heat exchanger device where the exhaust gas waste heat energy of a gas turbine power plant passes thru one side of a series of plates/sheets of material and or tubes and heats the process fluids on the opposite side and also a surface area condenser is incorporated to reduce the product vapor state to a liquid.

1 Claim, 1 Drawing Sheet

MICROTURBINE WITH CHP SYSTEM HAVING A DISTILLATION APPARATUS

This application claims benefit of the provisional application Ser. No. 60/727,518 filed Oct. 17, 2005.

BACKGROUND OF THE INVENTION

1. Field of the Invention

This invention relates generally to a power plant with a CHP (combined heat and power) system and more specifically it relates to a power plant CHP system with a distillation apparatus for providing a high efficiency electrical power plant with lower fuel usage and subsequently lower $CO_2$ emission specie (a byproduct of fossil fuel combustion) thru the use of exhaust gas waste heat of a gas turbine driven electrical power plant for distillation processes replacing the need for electrical heating elements.

2. Description of Prior Art

It can be appreciated that electrical power generation plants with a CHP system have been in use for years. Typically, a power plant with CHP system comprise for a gas turbine engine or reciprocating internal combustion engine driving a synchronous or non synchronous electrical generator incorporating the use of the exhaust gas waste heat for additional energy needs to yield high thermal power plant efficiency usually exceeding 60% depending on the cycle, making use of the waste exhaust heat for hot water, hot air, refrigeration or steam to drive a steam turbine. These power plants use fuel such as oil, bio-oil, waste fuel, coal, propane gas, natural gas, gasoline, alcohol, nuclear, geothermal or solar sources for a power-grid or onsite main or emergency electrical power for home, industry or marine vessels; power plants use internal combustion engines typically reciprocating or turbine engines, converting fuel energy into rotational shaft energy and intern rotate a synchronous speed generator (microturbine non synchronous speed alternator) having a rotor with a stator incorporating windings (microturbine alternator rotors have permanent magnets with no windings) for electrical energy output. Typically power plants are not portable or are limited due to weight especially reciprocating engine type but on the other hand the turbine engine historically lends more to portability but are typically have a higher purchase cost. Power plants are traditionally systems with large generators and grid tied that operate at a constant synchronous speed and was the intent of the current microturbine (U.S. Pat. Nos. 6,314,717, 6,605,928, and 5,497,615 to name a few) business having a smaller power plant (up to 15% efficiency having no heat exchanger and <28% with a heat exchanger) to be more portable and less costly but did not come to fruition of wide use, mostly not being competitive to the diesel reciprocating generator set $/Kw purchase cost even though the latter has emissions issues. Distillers used for desalination typically use resistive electrical heating elements of the vapor cycle; although some are efficient as in the desalination process or just generating clean water as in U.S. Pat. No. 4,671,856, the use of electrical resistive elements in heat the liquid to the vapor phase requires electricity from power plants (say stationary type) with efficiencies <40% and portable power plants <30%; if you use the turbine exhaust waste energy from the electrical power plant (preferably having low emission combustion to avoid any fouling of the heat exchanger gas side) for the vapor stage heating of the process fluid the related electrical power plant CHP overall efficiency, depending on the component efficiency of the distiller, could be above 60%.

The main problem with conventional distillers using resistive elements to heat the process liquids is the electrical energy use and subsequent $/Kw-hr costs; if the heat source from an electrical power plant gas turbine exhaust gas waste heat was incorporated, the related thermal efficiency of the power plant would increase thru this CHP (Combined Heat and Power) system. Reduced fuel usage yields less $CO_2$ emission specie.

Another problem with conventional distillers, is in the usage with boat/marine applications especially associated with smaller vessels for desalination (need for onboard water) for high purity water, typically incorporate resistive heater elements requiring electricity generated from the main propulsion engine (typically piston internal combustion engines) and thus reducing the engines overall efficiency. If a gas turbine power plant (typically high air flow vs low air flow piston engines) were incorporated either as a main power plant or APU (auxiliary power unit) and the exhaust gas waste heat replaced the electrical resistive to heat the salt water in the distillation process, this CHP system would reduce fuel consumption and higher electrical power generation efficiency would be realized. Also, this CHP system would remove the need for onboard large clean water storage transport tanks (store H2O from land base facilities). Considering non grid tie electrical power generation and or as independent power and having a need to produce potable water, a microturbine/hybrid microturbine power plant incorporating the exhaust gas waste heat for distillation process would yield a portable high efficiency electrical means of a CHP system with a reduced cost to produce high quality H2O.

In these respects, the power plant CHP system with a distillation apparatus according to the present invention substantially departs from the conventional concepts and designs of the prior art, and in so doing provides an apparatus primarily developed for the purpose of providing a high efficiency electrical power plant with lower fuel usage and lower $CO_2$ emission specie (a by-product of fossil fuel combustion although to lesser factor is a contributors to the world environmental emissions concern), thru the incorporation of a Combined Heat and Power (CHP) system, using exhaust gas waste heat of a gas turbine power plant for distillation processes replacing the need for electrical resistive heating elements.

SUMMARY OF THE INVENTION

In view of the foregoing disadvantages inherent in the known types of distillation processes using resistive electric heating element now present in prior art; the present invention provides a new distillation process incorporating the use of electrical power plant gas turbine exhaust gas waste heat in place of electrical resistive heating elements, thus providing a high efficiency electrical power plant with lower fuel usage and subsequent lower $CO_2$ emissions specie thru a Combined Heat and Power (CHP) system. The general purpose of the present invention, which will be described subsequently in greater detail, is to a provide a new power plant CHP system having a distillation apparatus that has many of the advantages of a power plant with CHP mentioned heretofore and many novel features that result in a new power plant CHP system with a distillation apparatus which in s not anticipated, rendered obvious, suggested, or even implied by any of the prior art power plant with CHP, either alone or in any combination thereof.

To attain this, the present invention generally comprises a distiller apparatus and a gas turbine engine electrical power plant. A heat exchanger device of the distiller where the exhaust gas waste heat energy of a gas turbine power plant passes thru one side of a series of plates/sheets of material and or tubes and heats cold feed fluid on the opposite side and incorporates a large surface area condenser to reduce the product vapor state to a liquid. An internal combustion Brayton cycle engine—electrical generating power plant having an engine body with at least one rotor spool incorporating a compressor and turbine rotors having blades that communicate with a combustor and has an integral alternator rotor with retained magnets co-axially positioned within a static laminated stack stator having wound wire and electrical output leads. A microturbine power plant CHP having distillation apparatus lending itself for portability.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a portable non grid tie capable high efficiency electrical power plant CHP system having a distillation apparatus that makes use of the gas turbine exhaust waste heat for the process fluid, replacing the electrical resistive heating elements.

An object of the present invention is to provide a high efficiency electrical power plant CHP system with distillation apparatus that yields a portable desalination means for boat/marine applications, thru a onboard gas turbine power plant or APU incorporating exhaust gas waste heat energy for distillation heat energy.

Another object is to provide a power plant CHP system having a distillation apparatus that yields a high thermal efficient power plant CHP system making use of the waste exhaust gas heat from microturbine power plant (a single spool with integral alternator rotor) or hybrid microturbine (a microturbine having a turbo charged multi staged compressor) for distillation heating means of the process fluids.

Other objects and advantages of the present invention will become obvious to the reader and it is intended that these objects and advantages are within the scope of the present inventions.

To the accomplishment of the above and related objects, this invention may be embodied in the form illustrated in the accompanying drawing, attention being called to the the fact, however, that the drawings are illustrative only, and that changes may be made in the specific construction illustrated.

BRIEF DESCRIPTION OF THE DRAWINGS

Various other object, features and attendant advantages of the present invention will become fully appreciated as the same becomes better understood when considered in conjunction with the accompanying drawing, in which like reference characters designate the same or similar parts throughout the several view, and wherein.

DESCRIPTION OF THE PREFERRED EMBODIMENT

Figure 1:
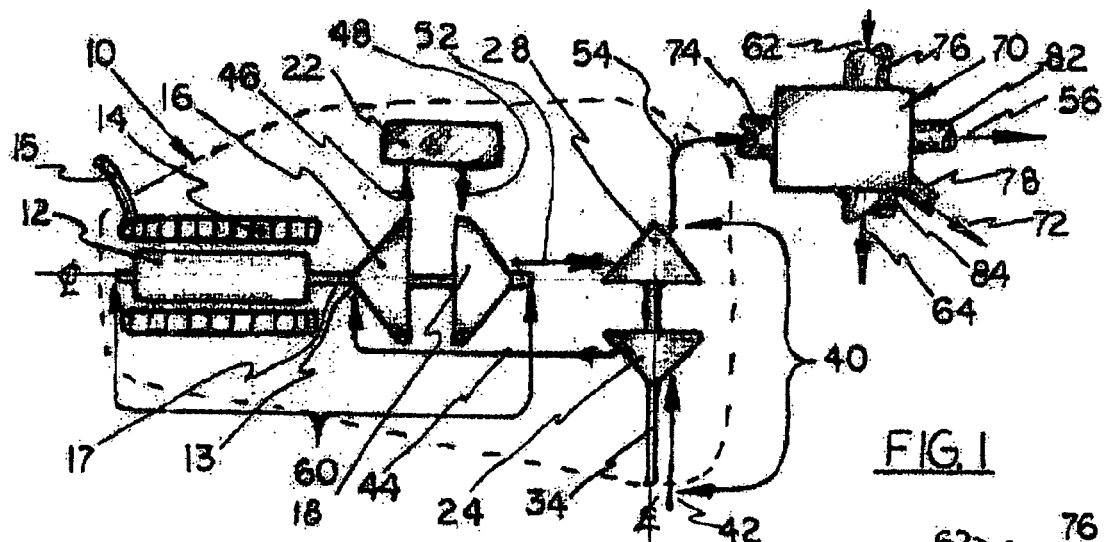
FIG. 1, is a schematic diagram, two spool-gas turbine electrical power plant, radial turbine driven turbo charger.

Turning now descriptively to the drawings, in which similar reference characters denote similar elements throughout the several view, the attached figures illustrate a power plant CHP system having a distillation apparatus, which comprises a distiller apparatus and a gas turbine engine electrical power plant. A heat exchanger device where the exhaust gas waste heat energy of a gas turbine power plant passes thru one side of a series of plates/sheets of material and or tubes and heats cold feed fluids on the opposite side and incorporates a large surface area condenser to reduce the product vapor state to a liquid. An internal combustion Brayton cycle engine—electrical generating power plant having as engine body with at least on rotor spool incorporating a compressor and turbine rotors having blades attached and fluid communicate with the combustor and has an integral alternator rotor with retained magnets co-axially positioned within a static laminated stack stator having wound wire and electrical output leads.

Figure 2:
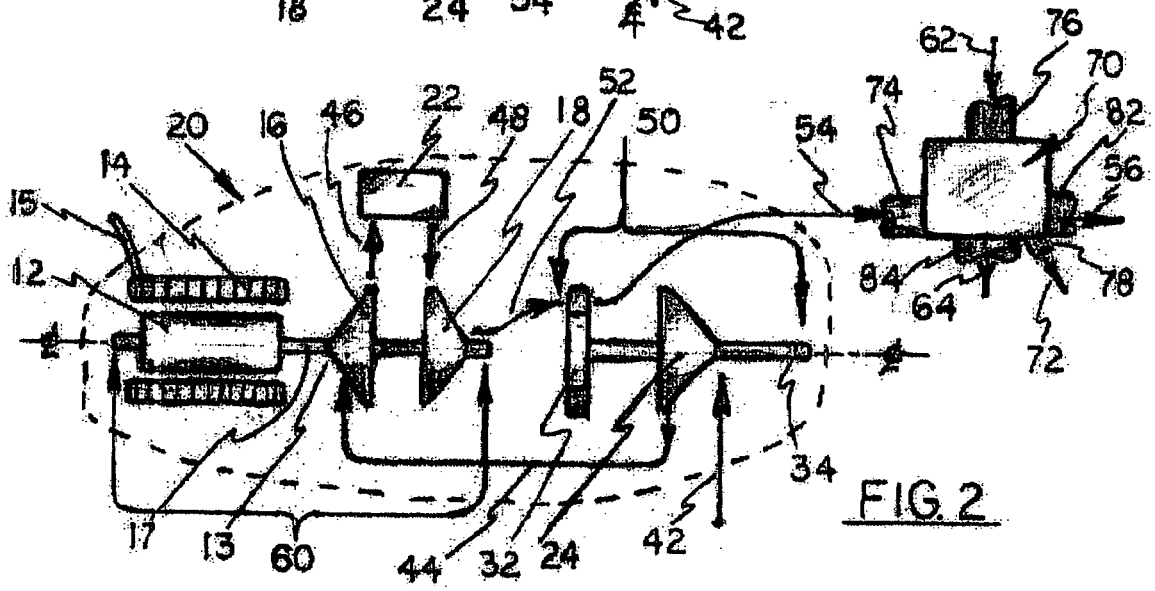
FIG. 2, is a schematic diagram, two spool-gas turbine electrical power plant, axial turbine driven turbo charger.
Figure 3:
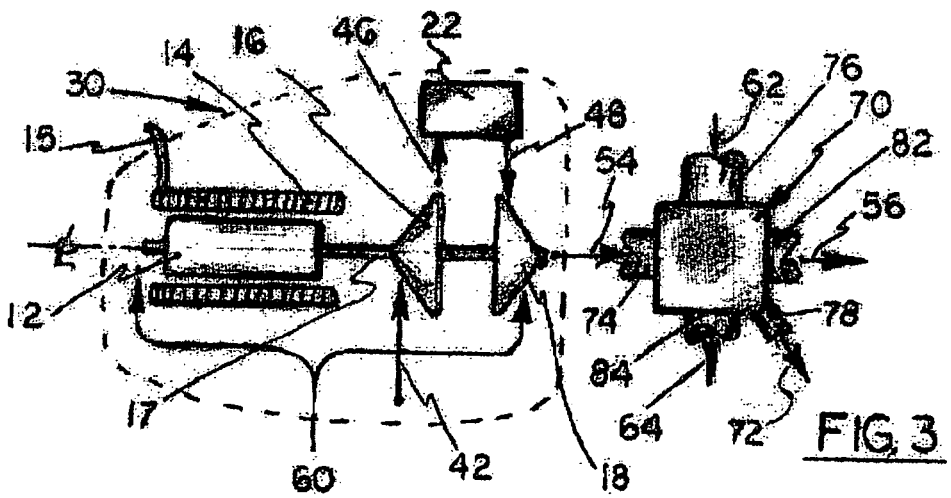
FIG. 3, is a schematic diagram, of a single spool-gas turbine electrical power plant, non multistage compressor.

A heat exchanger device where the exhaust gas waste heat energy of a gas turbine power plant passes thru one side of a series of plates/sheets of material and or tubes and heats cold feed fluids on the opposite side and incorporates a large surface area condenser to reduce the product vapor state to a liquid. The distiller 70 as depicted in FIGS. 1, 2 and 3 is an apparatus for heat exchange. An entrance duct 74 accepts the turbine exhaust gas waste heat 54 to the distiller where it heats the cold feed fluid 62 supplied through surface areas port 76 to a vapor state within the distiller and has internally a chiller structure with large surface areas incorporated to reduce the vapor state to a liquid form and has a reservoir to accept the distilled liquid and has a transfer tube 78 to allow the condensed fluids out of the distiller. The reduced temperature exhaust gas leaves the distiller 70 to atmosphere via duct 82. Applications are in distillation and incorporates counter flow heat exchange (for best efficiency) between exhaust gas fluid 54 and feed water 62. Various distillation applications include distill water, distill brines, distill alcohol, separate toxic chemicals, exchange temperature between fluids and distill salt water to name a few. The exhaust gas waste 54 exits the distiller 70 with reduced temperature and depending on the distiller efficiency, if the temperature were to exit close to ambient temperature it could yield the CHP system efficiency >90%. An inlet duct 74 of the distiller accepts the gas turbine exhaust (preferably of low emissions combustion to prevent heat exchanger plates from fowling) gas waste heat 54 and this fluid transitions thru the distiller in separate channels across large plated or tube areas and preferably in the opposite direction of the cold feed liquid to be heated. Within the distiller, the vapor, from the heating process, condenses on cooling walls of the boiler-condenser unit having a pressure atmosphere to improve the condensing process and the heat energy from the condensing process is further used to preheat the cold feed water prior to the exhaust gas energy being applied.

An internal combustion Brayton cycle engine—electrical generating power plant having an engine body with at least one rotor spool incorporating a compressor and turbine rotors both having blades and fluid communicate with a combustor and has an integral alternator rotor with retained magnets co-axially positioned within a static laminated stack stator having wound wire and electrical output leads. The preferred embodiment of the gas turbine power plant is represented in FIG. 1, having main components; a power turbine rotor spool 60, a turbo charger rotor spool 40 and engine body 10 (a microturbine having an integral alternator rotor with two spools creating a hybrid microturbine, staged compressors). The rotor shaft 17 rotatable, has a compressor rotor 16 with blades, is within a compressor chamber and fluid communicates with the heat energy combustor 22, the turbine rotor having blades 18 is connected to the compressor rotor 16 and also fluid communicates with the combustor 22, on a common shaft 17 an alternator rotor 12 with permanent magnets retained is integrated and positioned co-axially within a static laminated iron base stack 14 having electrical wires and output lead 15 all in engine body 10. The turbo charger rotor spool 40 having a rotatable shaft 34 with a bladed compressor rotor 24 and a radial turbine rotor 28 with blades and for simplicity is within engine body 10. The turbine 28 accepts exhaust energy 52 from the turbine 18 exhaust 28 to drive compressor 24, supplying turbocharged increased air flow 44 with pressure to the power spool 60 compressor 16 inlet 13. The power plant exhaust gas 54 from the turbine rotor 28 in the engine body 10, is ducted to the distiller 70 entrance 74. Another version of this power plant is represented in FIG. 2, having an engine body 20 and using a turbo charging rotor spool 50 with an axial type turbine 32 in place of the radial type turbine rotor 28 turbo charger of spool 40 of FIG. 1. A further version would include a power plant as in FIG. 3 with main components including: a single spool rotor 60 within engine body 30 and supplies turbine exhaust gas waste energy 54 to the distiller 70. The FIG. 3 exhibits a single spool 60 with alternator rotor 12 integral to a rotatable shaft 17 having a bladed compressor rotor 16 in a compressor housing of engine body 30 and fluid communicates with a combustor 22 and also a blade turbine rotor 18 fluid communicates with the combustor and is integrated to the compressor rotor 42 and common shaft 17; this as a power plant represents a microturbine having non synchronous electrical power generation. The alternator 12 integrated to the common shaft 17 creates a power spool and like in FIGS. 1 and 2 is positioned within a static laminate stack 14 having electrical wire and output lead 15. Waste heat turbine exhaust gas 54 is ducted to the distiller 70 thru duct 74.

The preferred embodiment as represented in FIG. 1 has a multi-spool rotor gas turbine power plant where the $1^{st}$ rotor spool 40 having a rotatable shaft 34 and a bladed compressor rotor 24 and blades turbine rotor 28, housed preferably within the engine body 10, accepts air from ambient 42 and supplies compressed air 44 to the inlet 13 of the compressor 16 of the $2^{nd}$ rotor spool 60. The $2^{nd}$ rotor spool 60 which during rotational operation creates electrical output power from the integrated alternator rotor 12 with permanent magnets having rotation within the electrical stator 14 with iron laminats and electrical wires with output leads 15 and consists of: a bladed compressor rotor 16 within a compressor housing of the engine body 10, having fluid communication with the combustor 22 and is attached to the rotatable rotor shaft 17 along with an integral alternator rotor 12 positioned within the electrical stator 14, and the blade turbine rotor 18 fluid communicates with the combustor 22. The combustor 22 within the engine body yields heat energy from combusted fuel supplied from an external source, and drives the turbine 18; the exhaust gas heat energy 52 from the turbine 18 is channeled to turbine 28 to drive the turbo charger #1 rotor spool 40 and subsequent compressor rotor 24. The turbine 28 exhaust gas heat energy 54 is ducted to he distiller 70 inlet 74 for distillation heat energy. FIG. 2 components are the same as FIG. 1 except the turbocharger spool 50 incorporates an axial turbine 32 in place of the radial turbine 28. A single spool power plant as in FIG. 3 is the same as the power plant FIG. 1 and 2 but without a turbine charging spool 40 or 50. Airflow 42 of FIG. 3 is from ambient and enters the rotor compressor rotor 16 of the spool 60. The rotor spool 60 consist of a rotatable shaft 17, a bladed compressor rotor 16 within a compressor housing in the engine body 30 and is in fluid communication with the combustor 22, a bladed turbine rotor 18 in communication with the combustor 22, and a alternator rotor 12 having permanent magnets retained and positioned co-axially with the static electrical wire wound stator 14 having iron laminats and output electrical leads 15. The exiting gas turbine power plant exhaust waste heat energy 54 is ducted to the distiller 70 for distillation process needs. The power plant 10 combined with the distiller 70 creates a Combine Heat and Power (CHP) system for high heat thermal efficiency making us of both electrical output power and the exhaust gas waste heat energy and also yields lower $CO_2$ emissions with less fuel usage. FIG. 1 represents the preferred embodiment depiction a gas turbine power plant 10 having an integral high speed alternator 12 integrated to the #2 rotor spool 60 and distiller 70 that receives the turbine power plant exhaust gas waste heat 54 for its heat energy. Typically to start the power plant the rotor spool 60 is rotated to a specified speed either by external electrical energy to the stator 14 powering the alternator 12 or by fluid impingement to the compressor rotor 16 or turbine rotor 18 and sequentially fuel is delivered to the combustor 22 and ignited developing heat energy to drive the turbine 18 of rotor spool 60 and at a specific higher rotor spool speed the energy from the combustor 22 yields a self sustaining speed at which time the starter assist energy is discontinued. Rotation of the #2 spool compressor rotor 16 blades, draws in air 42 thru the upstream staged #1 spool rotor 40, compressor rotor 24 and inlet 42. Once the combustor 22 fueled heat energy reaches the rotor turbine 28, thru the turbine inlet 48 supply, rotor spool 60 acceleration to a self-sustaining rotor speed is attainable along with a supply of staged compressor air to the compressor 16 from compressor 24 of the rotor spool 40, receiving heat energy 52 from the power turbine rotor 18 exhaust. The compressor air supply to the combustor is thru channels 46 exiting the #2 compressor 16. Electrical out put power is thru electrical leads 15 which are interconnected to the electrical wires wound thru the stator iron laminated stack 14. Relative motion between the alternator rotor 12, having retained permanent magnets and the stator 14 laminated stack teeth geometry co-axially in close proximity to the magnets, cause a magnetic flux change inducing electrical current for electrical power generation. The waste heat 54 from the turbine rotor 28 of the turbo charger spool 40 is ducted to the a distiller 70 inlet 74 to heat incoming cold process fluids 62 by means of an internal counter flow (most desirable) heat exchange process for distillation, requiring large surface areas of plates/sheets or tubes to transfer heat between the isolated fluid (process fluid and exhaust gas). The isolated exhaust gas 56, with reduced temperature exits the distiller thru duct 82. Any fluids considered by-product non distilled product 64 is ducted 84 overboard. The vapors from the heat process are collected internally on a chiller structure, reducing the vapor product temperature, reducing the vapor temperature for a liquid state and then ducted 78 to a reservoir.

As to further discussion of the manner of usage and operation of the present invention, the same should be apparent from the above description. Accordingly, no further discussion relating to the manner of usage and operation will be provided. With respect to the above description then, it is to be realized that the optimum dimensional relationship for parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to exact construction and operation shown and described, and accordingly, all suitable modifications and equivalents may be resorted to falling within the scope of the invention.

What we claim:

1. An electrical power generation system with a distiller apparatus, comprising: a engine body; a combustor heat source in said engine body; compressor chamber with an air inlet in said engine body, has fluid communication with said combustor heat source; a rotatable compressor rotor with blades attached, is located in said compressor chamber; a rotatable turbine rotor with blades attached, is in fluid communication with said combustor, is attached to the compressor rotor in said body; and alternator rotor with retained permanent magnets is in said engine body, and integrated to said compressor rotor and said turbine rotor to form an electrical output power spool; an iron laminat stator with electrical wire is co-axially located about and in close proximity to the said alternator rotor were relative rotation cause magnetic flux and subsequent electricity to be generated; an output power spool turbine exhaust duct to direct the waste heat away from the said output power spool turbine rotor and in said engine body; a turbo charger system in the said engine body has a minimum of one rotor spool, having a compressor rotor with attached blades in a compressor housing and in fluid communication with the said electrical output power spool compressor rotor air inlet and the turbo charger turbine rotor with blades attached is in fluid communication with said electrical output power spool compressor rotor air inlet and the turbo charger turbine rotor with blades attached in fluid communication with the said electrical output power spool turbine exit gases, said output power turbine exhaust gas duct; a distiller apparatus in fluid communication with the said turbo turbine exhaust gas waste heat, said turbo turbine exhaust duct, turbo charger turbine rotor exit to create vapor from the process fluid of the distillation operation, the said turbo turbine exhaust gas waste heat and said process fluid transition thru the heat exchanger distiller system in separate channels/opposite sides.

* * * * *